(12) United States Patent
Yoder et al.

(10) Patent No.: US 9,987,577 B2
(45) Date of Patent: Jun. 5, 2018

(54) KAMMPROFILE GASKETS

(71) Applicant: GARLOCK SEALING TECHNOLOGIES, LLC, Palmyra, NY (US)

(72) Inventors: Chad Yoder, Palmyra, NY (US);
Matthew Tones, Palmyra, NY (US);
Christopher Tones, Palmyra, NY (US)

(73) Assignee: Garlock Sealing Technologies, LLC, Palmyra, NY (US)

( * ) Notice: Subject to any disclaimer, the term of this patent is extended or adjusted under 35 U.S.C. 154(b) by 941 days.

(21) Appl. No.: 14/018,200

(22) Filed: Sep. 4, 2013

(65) Prior Publication Data

US 2015/0060352 A1    Mar. 5, 2015

(51) Int. Cl.
*B01D 35/28* (2006.01)
*F16J 15/02* (2006.01)
*F16J 15/06* (2006.01)
*F16J 15/12* (2006.01)

(52) U.S. Cl.
CPC ............ *B01D 35/28* (2013.01); *F16J 15/064* (2013.01); *F16J 15/122* (2013.01)

(58) Field of Classification Search
CPC .......... F16J 15/064; F16J 15/122; F16J 15/02; F16J 15/022; B01D 35/28

USPC .............................. 210/497.01, 456; 277/627
See application file for complete search history.

(56) References Cited

U.S. PATENT DOCUMENTS

| 5,342,511 A * | 8/1994 | Brown ................... B01D 27/06 210/137 |
| 2002/0030326 A1* | 3/2002 | Bettencourt ........... F16J 15/065 277/602 |
| 2005/0116427 A1* | 6/2005 | Seidel .................. F16J 15/0818 277/610 |

* cited by examiner

*Primary Examiner* — Robert Clemente
*Assistant Examiner* — Akash Varma
(74) *Attorney, Agent, or Firm* — Perkins Coie LLP

(57) ABSTRACT

A kammprofile gasket is provided. The kammprofile gasket forms a flow aperture into which an object, such as a strainer or orifice plate, may be machined into the gasket to provide additional functionality. The gasket has a core material with a sealing material overlaying a portion of the core material such that a seal is formed between opposing flanged surfaces. The core material may be machined such that a base plate for an orifice or a plurality of support beams extend into the flow aperture. The plurality of support beams may provide support for a filter or strainer coupled upstream to the core material. The base plate may provide an inclined surface, such as a cone, to an orifice where the cone functions to direct excess flow away from the orifice to self flush.

7 Claims, 8 Drawing Sheets

KAMMPROFILE GASKETS

CROSS-REFERENCE TO RELATED PATENT APPLICATIONS

None

BACKGROUND

Nuclear power systems have numerous fluid systems. The fluid systems comprise pipes, pumps, pressure vessels, heat exchangers, and the like. Nuclear power fluid systems also have strict requirements regarding fluid purity and foreign material exclusion, sometimes referred to as "FME." The fluid purity relates to particulate and foreign matters in the media.

To facilitate the removal or suspension of foreign material in the fluid, many of the fluid systems in nuclear power systems use conventional strainer gaskets. Conventional strainer gaskets comprise a conventional spiral wound gasket where the spiral wound gasket forms an aperture. A strainer is typically fitted to the inner winding of the spiral wound gasket. The strainer may be snapped fitted or welded to the inner winding.

The conventional spiral wound gasket with a strainer is an unsatisfactory solution, however. First, if the gasket fails, the strainer, as well as the sealing material, may be introduced to the fluid system resulting in a large FME in the fluid, which could damage equipment or result in decontamination of a hazardous system. Moreover, spiral wound gaskets typically require high compressive loads to effectuate a seal between opposed flanges.

Thus, against this background, an improved strainer gasket is desirable.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

The technology of the present application provides a gasket having a core material with sealing material overlapping at least a portion of the core material. An inner sidewall of the gasket forms a fluid aperture. Objects that are formed integral with the inner sidewall extend radially inwardly from the inner sidewalls. The objects include in one aspect a plurality of support beams joining at a convergence, which may be a ring. The objects in another aspect include a base plate having an integral cone about at least one orifice to provide a flow path.

These and other aspects of the present system and method will be apparent after consideration of the Detailed Description and Figures herein.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application is described with specific reference to one or more Kammprofile gaskets. One of ordinary skill in the art on reading the disclosure, however, would now recognize that the technology disclosed herein is usable with other styles of gaskets. Moreover, the technology described herein relates to strainer and orifice plate gaskets. While the technology is explained with specific reference to strainers and orifice plates, other objects may be machined into the fluid aperture. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Figure 1:
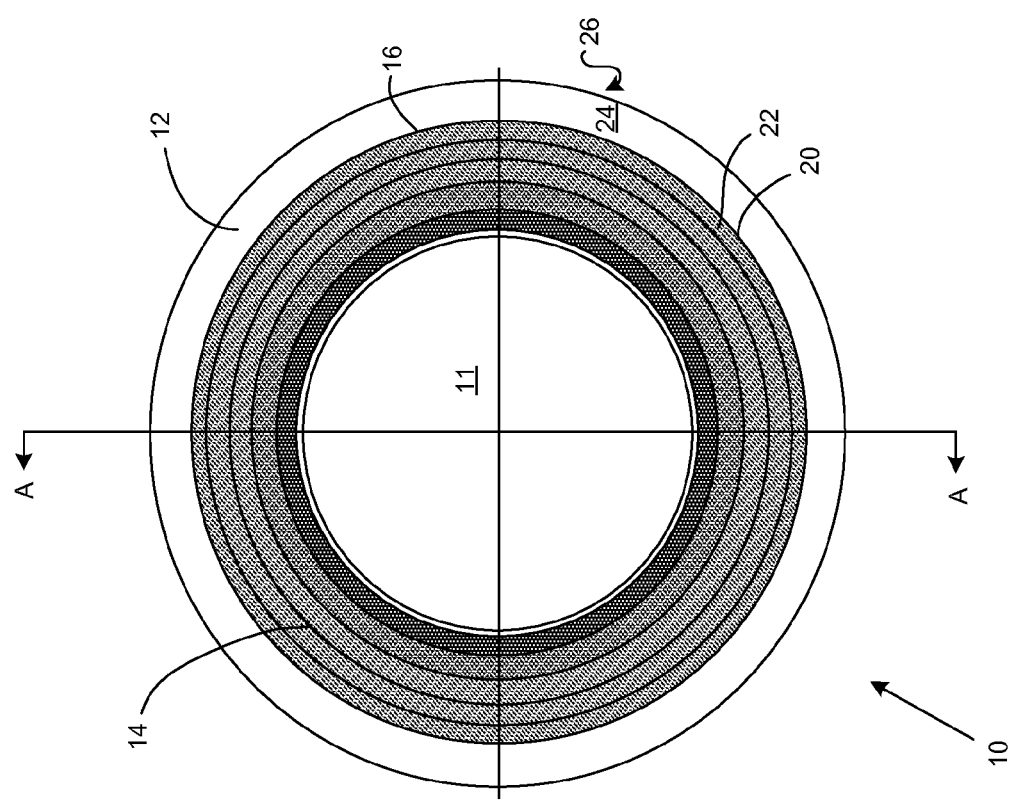
FIG. 1 is a top plan view of a gasket consistent with the technology of the present application.
Figure 2:
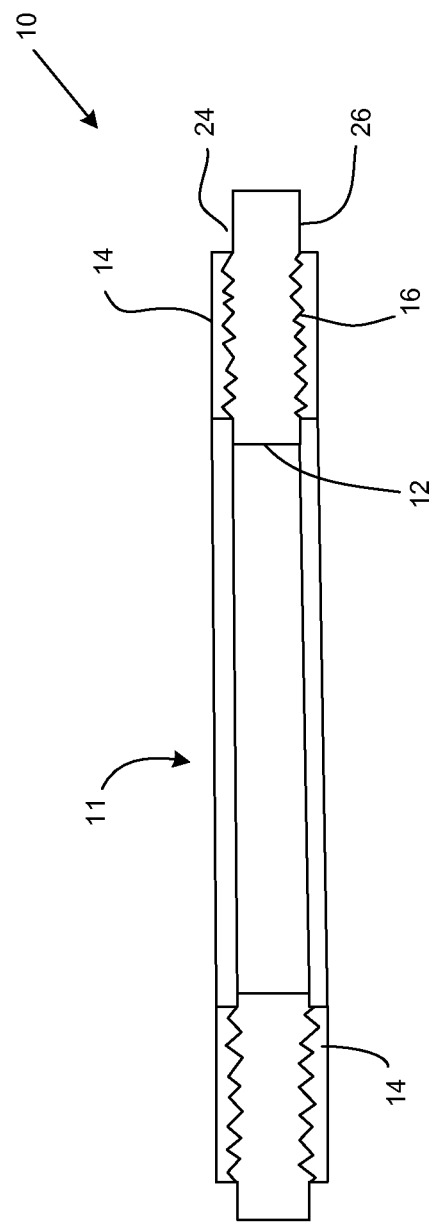
FIG. 2 is a cross section of the gasket of FIG. 1.

With reference now to FIG. 1, a top plan view of a gasket 10 is provided. The gasket 10 defines a fluid aperture 11. The gasket 10 has a core material 12 with a sealing material 14 overlaying at least a portion of the core material 12. The sealing material 14 overlays a section of the core material 12 having a machined or formed profile 16. The machined or formed profile 16 is generally formed by a series of ridges 20 and grooves 22 formed on opposing sides of the core material 12. Generally, a ridge on a first side 24 of the gasket 10 has a corresponding groove on a second side 26, which is opposite the first side 24, of the gasket 10. Referring now to FIG. 2, a cross sectional view of the gasket 10 along line A-A is provided.

In use, the gasket 10 is placed between opposed flanged surfaces. The flanged surfaces are compressed together such that the sealing material 14 forms a seal between the sealing material and the flanged surfaces. The compression may be accomplished via a torque load on a bolt or the like.

The core material 12 may be formed from a variety of materials, but generally the gasket 10 has a core material 12 formed from a metal, such as, for example, stainless steel, aluminum, brass, copper, Inconel® Monel®, nickel, bronze, titanium, or the like. The core material 12 may be formed by laser etching or milling a solid piece of metal to the profile desired including the fluid aperture.

Figure 3:
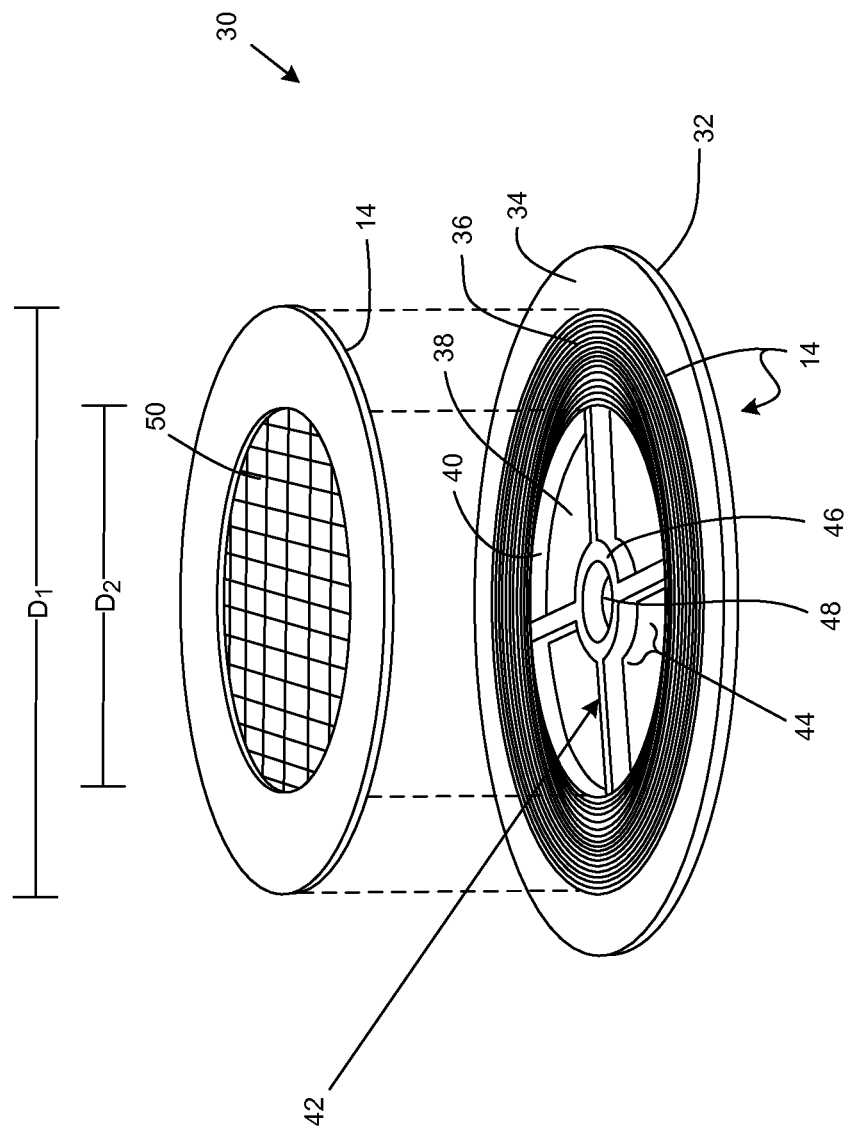
FIG. 3 is a partially exploded perspective view of a gasket consistent with the technology of the present application.

Referring now to FIG. 3, a gasket 30, which is partially exploded, incorporating the technology of the present application is provided. The gasket 30 includes a core material 32. The core material is provided with an outer alignment ring 34, a corrugated profile section 36, and a fluid aperture 38. The fluid aperture 38 is defined by an annular inner (or interior) sidewall 40. A plurality of support beams 42 are integral with and extend radially inward from the annular inner sidewall 40 to join at a convergence 44. The convergence 44 is shown as an annular ring 46 in FIG. 3, but could be any shape where the plurality of beams 42 meet or join. While shown as four (4) symmetrical beams 42 extending radially inward at 0, 90, 180, and 270 degrees about a circle, more or less beams 42 may be provided as required by the fluid system. Also, asymmetrical beams would be possible. The ring 46 is provided generally at the geometric center of the fluid aperture 38 to allow for a centralized fluid flow path 48. The ring 46 or a plurality of rings 46 may be provided to provide alternative flow patterns. Also, ring 46 may be shaped in alternative shapes, such as a crescent, rectangle, triangle, or the like.

As described above, a sealing material 14 would overlay the machined or formed profile section 36 of the gasket 30. The sealing material 14 may be comprised of, for example, rubber, graphite, polytetrafluoroethylene (PTFE), fluorinated ethylene proplene (FEPs), mica, or the like. For example, the sealing material 14 may be THERMa-PUR™, which is available from Garlock Sealing Technologies, LLC of Palmyra, N.Y.

Shown exploded from the gasket 30 is a strainer or mesh filter 50. The mesh filter 50 is sized to overlay at least a portion of the machined or formed profile section 36 of the gasket 30. In certain embodiments, the mesh filter 50 has a diameter approximately equal to the outside diameter $D_1$ of the sealing material 14. In other embodiments, the diameter of the mesh filter 50 is less than the outside diameter $D_1$ of the sealing material 14 but greater than the inside diameter $D_2$ of the sealing material 14. The inside diameter $D_2$ is approximately equal to the diameter of the fluid aperture 38. In still other embodiments, the diameter of the mesh filter 50 may be greater than the outside diameter $D_2$ of the sealing material. Generally, however, the mesh filter 50 would not extend beyond the core material 32 in most cases.

In one alternative embodiment, the mesh filter 50 is formed as a continuous piece of metal from the metal core 32. However, as shown in FIG. 3, the mesh filter 50 or strainer is formed from a separate material as shown. Generally, the mesh filter 50 may be formed from metal, such as, for example, stainless steel, but could be any of the metals outlined above usable with the metal core. An additional layer of sealing material 14 is provided on the upstream side of the mesh filter 50.

Figure 4:
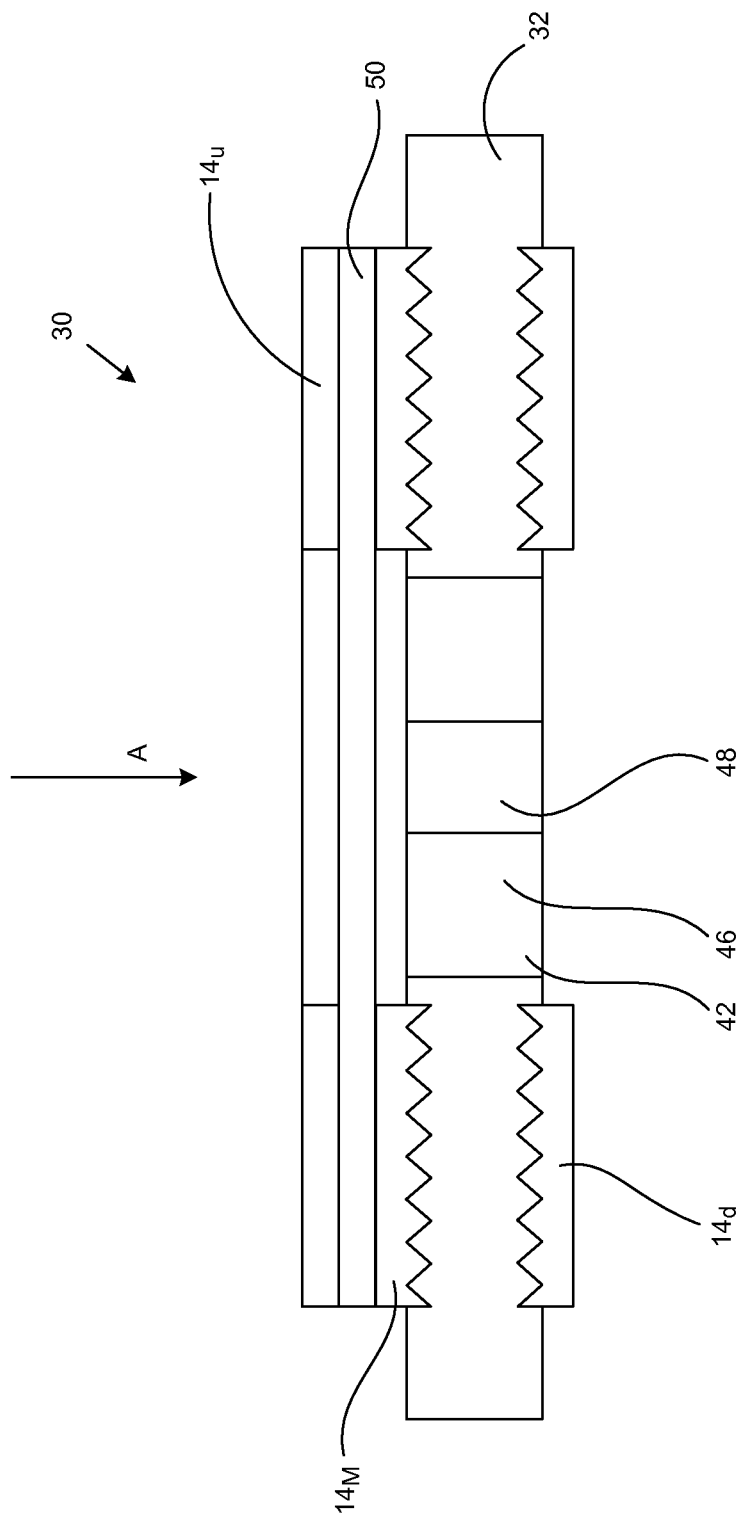
FIG. 4 is a cross section of the gasket of FIG. 3.

FIG. 4 shows the gasket 30 in cross section. Arrow A shows the direction of fluid flow through the gasket 30, which direction is used to describe orientation using terms such as upstream and downstream. In that regard, FIG. 4 shows a first sealing material $14_u$ that is upstream to the remainder of the gasket 30. The first sealing material $14_u$ is followed by the mesh filter 50. The first sealing material $14_u$ forms a seal between a first flanged surface (not shown) and the mesh filter 50. Following the mesh filter 50 is a second sealing material $14_m$ that is mid-stream relative to the gasket 30. The metal core 32 follows the second sealing material $14_m$. The beams 42 and ring 46 define the central flow path 48. The second sealing material $14_m$ forms a seal between the mesh filter 50 and the metal core 32. Finally, a third sealing material $14_d$ is provided downstream to the remainder of the gasket 30. The third sealing material $14_d$ forms a seal between the metal core 32 and the second flanged surface (not shown).

The beams 42 may be removed from or flush with the mesh filter 50 depending on the milling of the metal core 32. In either event, the beams 42 and ring 46 (or convergence 44) provide support for the mesh filter 50. Also, in the event the first or second sealing materials $14_u$, or $14_m$ fail, the beams 42 and ring 46 inhibit the filter material from becoming foreign material in the fluid system downstream from the gasket 30.

The gasket 30 provides many advantages over conventional spiral wound strainer gaskets that are common in the art. One advantage is the sealing material 14 forms a seal at a lower load than conventional spiral wound gaskets. Also, the sealing material 14 is generally better at conforming to the flanged surfaces than traditional spiral wound gaskets. Another advantage is the integrated beams and convergence provide a failsafe if the strainer portion of the gasket fails. Moreover, the strainer or mesh itself is clamped to the upstream side of the metal core, which provides additional support, rather than being snap fit or welded internal to the spiral windings. Unlike traditional spiral wound gaskets, the gasket 30 does not have windings that are subject to breaking or unwinding introducing foreign material into the fluid media. Still also, the core material is milled, machined, or laser cut to provide any required thickness to fit a given application or space, unlike a spiral wound gasket that generally has a minimum compressed thickness of approximately 0.130".

Figure 5:
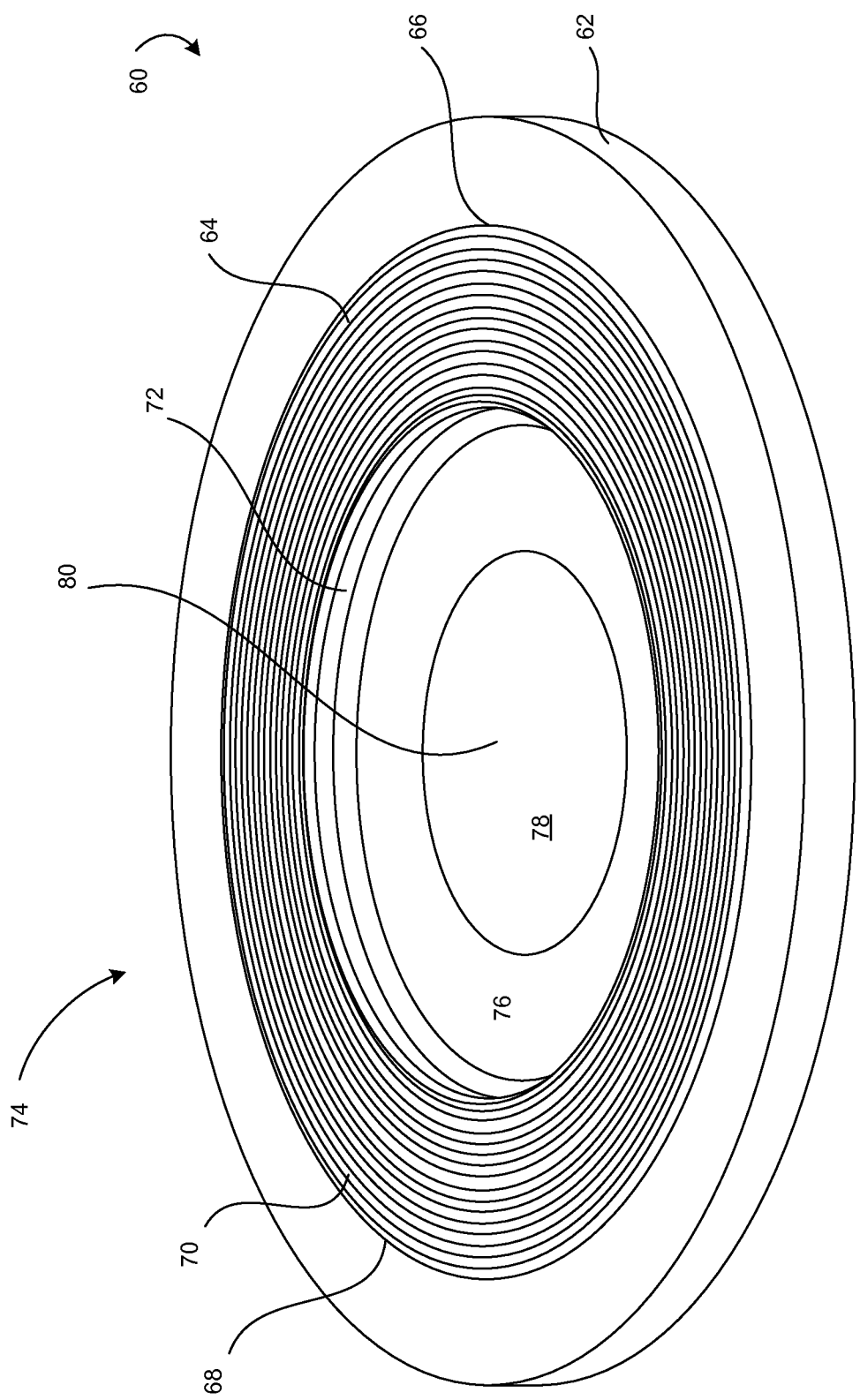
FIGS. 5 and 6 are perspective views of a gasket consistent with the technology of the present application.
Figure 7:
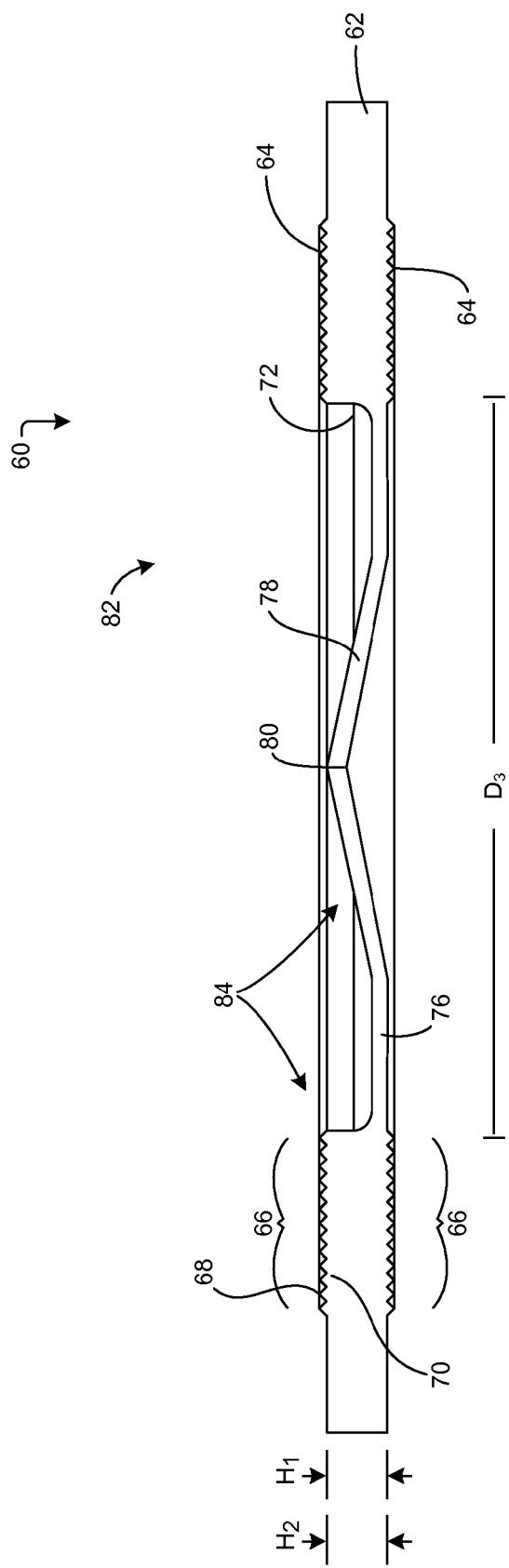
FIG. 7 is a cross section of the gasket of FIG. 5.

While usable alone, the strainer gasket 30 is frequently used with an orifice plate or flow reducer. Traditionally, orifice plates are flat, machined metal discs with a predetermined hole, bore, or aperture to control or restrict flow rates. The technology of the present application, however, provides for an improved orifice plate. With reference now to FIGS. 5 and 7, a perspective view and a cross-sectional view of an orifice gasket 60 is provided. The orifice gasket 60 is shown as a kammprofile gasket, similar to gasket 30 (or strainer gasket 30) above. Neither the orifice gasket 60 nor the strainer gasket 30, however, require the kammprofile. The orifice gasket 60 has a metal core 62 with a sealing material 64 overlaying at least a portion of the metal core 62. The metal core 62 is formed with a machined or formed profile section 66. The machined or formed profile section 66 is formed by a series of alternating ridges 68 and grooves 70. The orifice gasket 60 has an inner sidewall 72 generally defining a flow aperture 74 having a diameter $D_3$. As best seen in FIG. 7, extending radially inward from the downstream side or downstream edge of the inner sidewall 72 is a base plate 76. The base plate 76 is shown flat or generally perpendicular to the direction of flow of the fluid media. The base plate 76 may be convex or concave rather than flat. The base plate 76 transitions to a cone 78 having a central orifice 80. The cone 78 extends from the base plate 76 towards an upstream side 82 of the gasket 60. The cone 78 provides for flow not moving through the central orifice 80 to flush any foreign material from the central orifice 80 towards into a flush zone 84, which zone is defined by the inner sidewall 72, base plate 76, and cone 78. While shown as a cone 78, the inclined or tapered walls extending from the base plate 76 may be triangular, pyramidal, or other shapes. Also, while shown as a linear surface, the cone 78 may be a compound angle surface, a convex surface, or a concave surface. While the cone 78 provides a particular advantage to flush any foreign material away from the central orifice 80, the cone 78 may be removed in favor of extending the flat base plate 76 to the central orifice 80. The cone 78 is shown having height $H_1$ substantially equal to the height $H_2$ of the core material 62. This provides a reasonably low profile. However, the cone 78 may have a height $H_1$ greater than or less than the height $H_2$ of the core material 62 depending on system characteristics.

Figure 6:
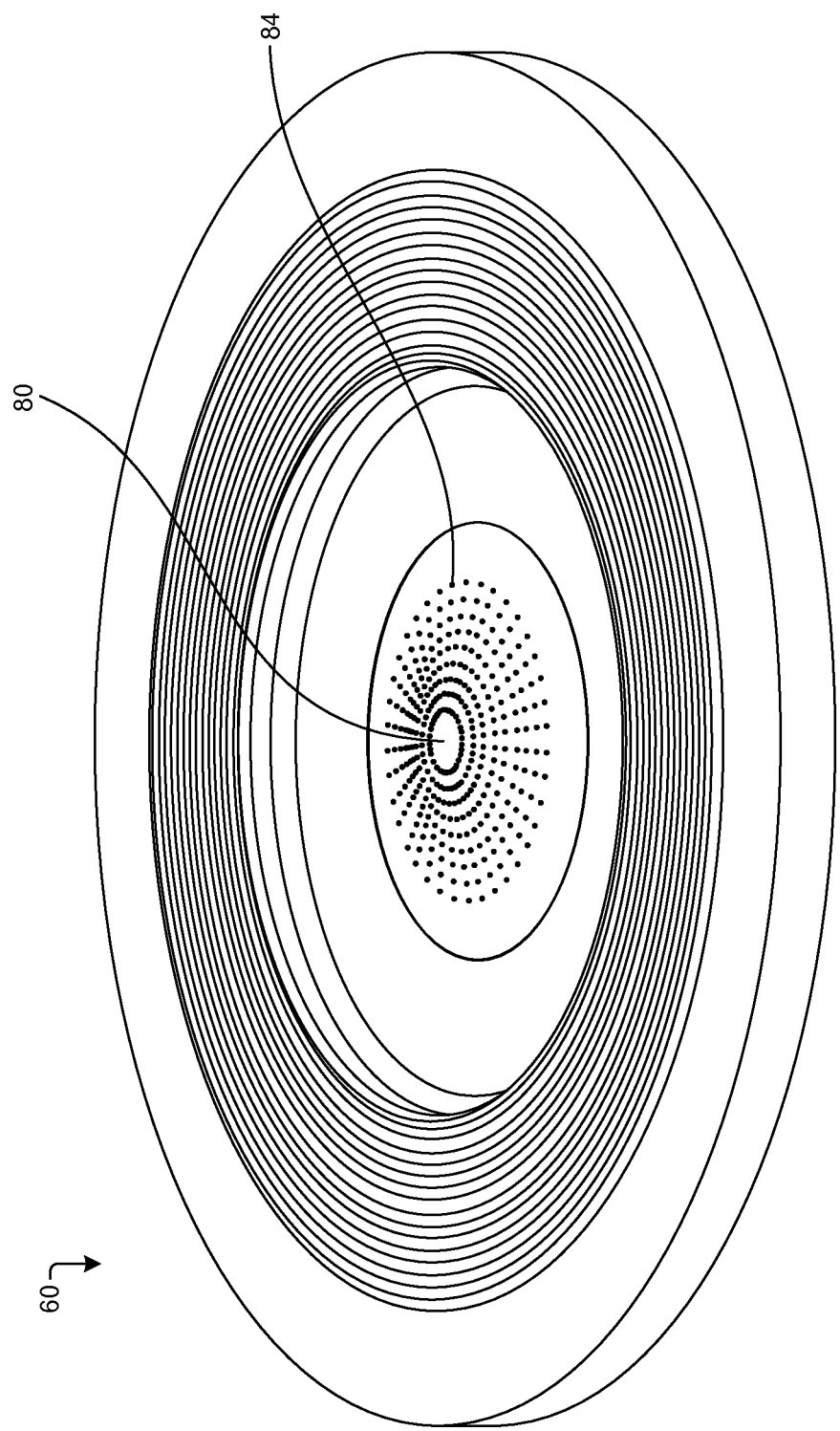

While FIGS. 5 and 7 show an orifice gasket 60 having a single central orifice 80, multiple orifices are possible. With reference to FIG. 6, an orifice gasket 60 is shown with a central orifice 80 as well as a plurality of additional orifices 84. Notice, central orifice 80 is optional in the configuration of FIG. 6. FIGS. 5 and 6 show a central orifice 80 and/or a symmetrical plurality of orifices 84. As can be appreciated, when used in conjunction with a strainer gasket 30 above, it can be appreciated that the central flow path 48 formed by the rings 46 facilitate allowing flow of the media to the central orifice 80. However, as can be appreciated, patterned flow or the like may be beneficial such that the flow path 48 and the orifice 80 (or plurality of orifices 84) may be off center or the like as required by the system application.

Figure 8:
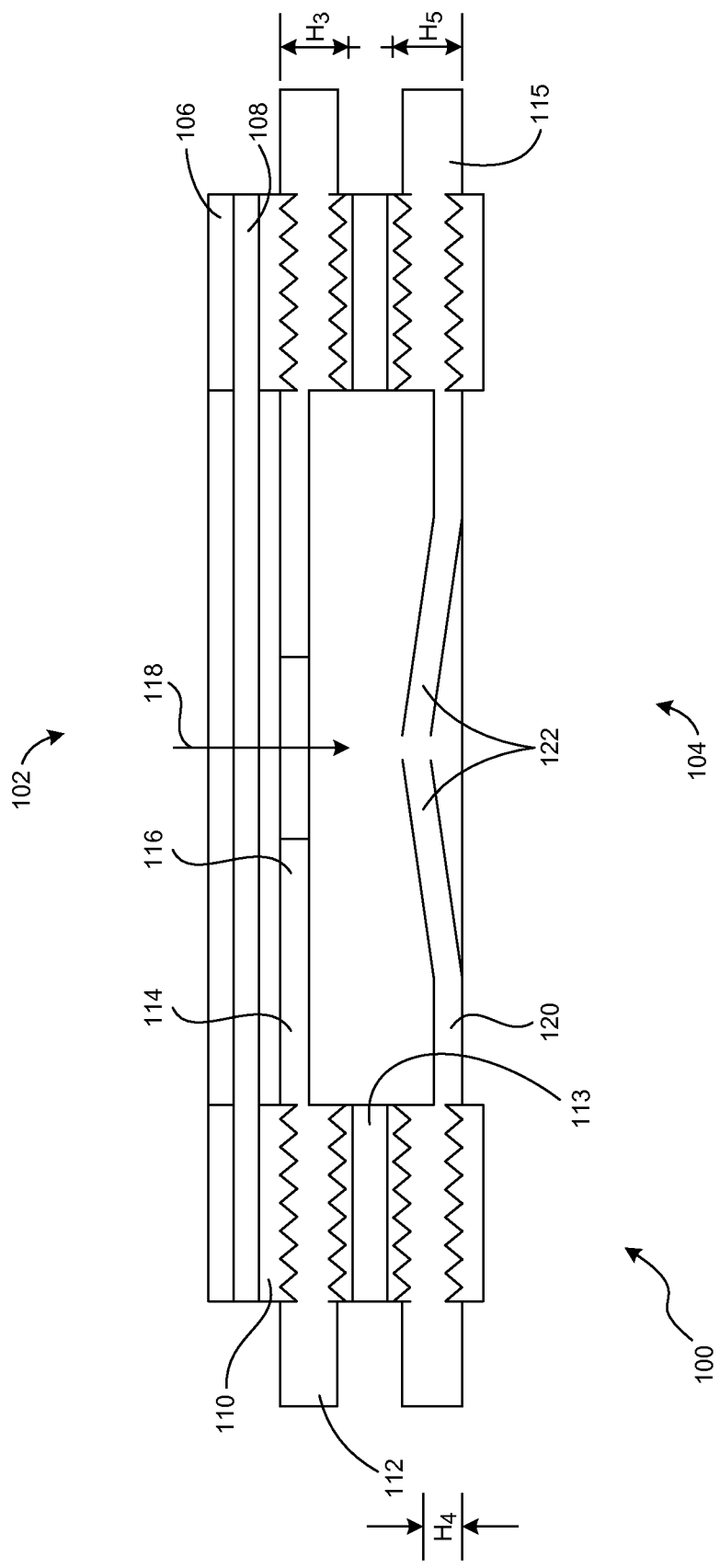
FIG. 8 is a cross section of a gasket consistent with the technology of the present application.

While shown and used as separate components, in certain applications, the strainer gasket 30 and the orifice gasket 60 are used in conjunction. In certain embodiments, the orifice gasket 60 and the strainer gasket 30 can be combined into a single gasket 100. With reference to FIG. 8, a cross sectional view of the combination gasket 100 is provided. Generally, the features of the strainer gasket 30 and the orifice gasket 60 are combined, and will not be re-explained herein. From the upstream side 102 to the downstream side 104, the combination gasket 100 includes a first sealing material 106 coupled to a filter 108, which could be a mesh filter. A second sealing material 110 is coupled to the downstream side of the filter 108 and upstream of a first core material 112. The first core material 112 has a height $H_3$. Extending radially inwardly from the first core material 112 are a plurality of beams 114 extending to a ring 116. The ring 116 defines a central flow path 118. Downstream of first core material 112 is an intermediate sealing material 113. Coupled to the downstream side of sealing material 113 is a second core material 115. The second core material 115 has a height $H_5$. Extending radially inwardly from the second core material 115 is a base plate 120 and cone 122. The cone 122 terminates in a central orifice 124 that is substantially aligned with the central flow path 118. The cone 122 extends to a height $H_4$ that is less than the combination of height $H_3$ and $H_5$. The height difference allows the filter and self flushing cone to cooperate.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A system for reducing flow comprising:
an annular strainer gasket comprising,
a first core material, the first core material having an upstream side, a downstream side, and a first core material radial inner sidewall;
a plurality of beams integrally formed with the first core material and extending radially inward from the first core material radial inner sidewall to a convergence;
a first sealing material having an upstream side and a downstream side, the first sealing material overlaying at least a portion of the upstream side of the first core material;
a second sealing material having an upstream side and a downstream side, the second sealing material overlaying at least a portion of the downstream side of the first core wherein the first and second sealing materials are aligned in an axial direction generally aligned in an axial direction;
a filter, the filter coupled to the upstream side of the first sealing material, the filter having an upstream side and a downstream side; and
a third sealing material coupled to the upstream side of the filter, wherein the third sealing material is aligned with the first sealing material and the second sealing material in an axial direction; and
an annular orifice gasket positioned downstream of the annular strainer gasket and aligned in an axial direction with the annular strainer gasket comprising,
a second core material, the second core material having an upstream side, a downstream side, and a second core material radial inner sidewall wherein the second core material radial inner sidewall has a downstream edge;
a fourth sealing material having an upstream side and a downstream side, the fourth sealing material overlaying at least a portion of the upstream side of the second core material;
a fifth sealing material having an upstream side and a downstream side, the fifth sealing material overlaying at least a portion of the downstream side of the second core material, wherein the fourth and fifth sealing materials are aligned with each other and with the first and second sealing materials in an axial direction;
a base plate integrally formed with the second core material and extending radially inwardly from the second core material radial inner sidewall; and
at least a first orifice, wherein the first orifice is a flow restrictor.

2. The system of claim 1 wherein the convergence is a ring that defines a central flow path wherein the central flow path is aligned with the first orifice.

3. The system of claim 1 wherein the base plate extends radially inwardly from the downstream edge of the second core material inner sidewall and further comprises a cone integrally formed with the base plate such that the base plate and cone form a self-flushing zone.

4. The system of claim 1, wherein:
the first core material comprises a profiled portion formed by a series of alternating ridges and grooves and where the first and second sealing materials overlay the profiled portion of the first core material; and
the second core material comprises a profiled portion formed by a series of alternating ridges and grooves and where the fourth and fifth sealing materials overlay the profiled portion of the second core material.

5. The system of claim 3, wherein the second core material has a first height and the cone has a second height and the first height and the second height are equal.

6. The system of claim 1, wherein the first sealing material, the second sealing material, the third sealing material, the fourth sealing material and the fifth sealing material each include a radial inner sidewall, and the radial inner sidewall of each of the first sealing material, the second sealing material, the third sealing material, the fourth sealing material and the fifth sealing material are aligned with each other and with the radial inner sidewall of the first core material and the radial inner sidewall of the second core material.

7. A system for reducing flow comprising:
an annular strainer gasket comprising,
a first core material, the first core material having an upstream side, a downstream side, and a first core material radial inner sidewall;
a plurality of beams integrally formed with the first core material and extending radially inward from the first core material radial inner sidewall to a convergence, the convergence defining a first orifice having a first diameter;
a first sealing material having an upstream side and a downstream side, the first sealing material overlaying at least a portion of the upstream side of the first core material;
a second sealing material having an upstream side and a downstream side, the second sealing material overlaying at least a portion of the downstream side of the first core material, wherein the first and second sealing materials are generally aligned in an axial direction;
a filter, the filter coupled to the upstream side of the first sealing material, the filter having an upstream side and a downstream side; and
a third sealing material coupled to the upstream side of the filter, wherein the third sealing material is aligned with the first sealing material and the second sealing material in an axial direction; and
an annular orifice gasket positioned downstream of the annular strainer gasket and aligned in an axial direction with the annular strainer gasket comprising,
a second core material, the second core material having an upstream side, a downstream side, and a second core material radial inner sidewall wherein the second core material radial inner sidewall has a downstream edge;
a fourth sealing material having an upstream side and a downstream side, the fourth sealing material overlaying at least a portion of the upstream side of the second core material;
a fifth sealing material having an upstream side and a downstream side, the fifth sealing material overlaying at least a portion of the downstream side of the second core material, wherein the fourth and fifth sealing materials are aligned with each other and with the first and second sealing materials in an axial direction; and
a base plate integrally formed with the second core material and extending radially inwardly from the second core material radial inner sidewall, wherein the radially inner end of the base plate angles in an upstream direction to form a cone with a center orifice having a second diameter;
wherein the center orifice and first orifice are coaxially aligned and the second diameter of the center orifice is smaller than the first diameter of the first orifice.

* * * * *